United States Patent
Maennl et al.

(10) Patent No.: US 10,442,718 B2
(45) Date of Patent: Oct. 15, 2019

(54) METHOD OF PRODUCING GLASS VIALS

(71) Applicant: SCHOTT AG, Mainz (DE)

(72) Inventors: Reinhard Maennl, Mitterteich (DE); Stephan Tratzky, Neustadt an der Waldnaab (DE); Franz Jaeger, Tirschenreuth (DE)

(73) Assignee: SCHOTT AG, Mainz (DE)

(*) Notice: Subject to any disclaimer, the term of this patent is extended or adjusted under 35 U.S.C. 154(b) by 501 days.

(21) Appl. No.: 15/000,072

(22) Filed: Jan. 19, 2016

(65) Prior Publication Data

US 2016/0130170 A1 May 12, 2016

Related U.S. Application Data

(63) Continuation of application No. PCT/EP2014/062550, filed on Jun. 16, 2014.

(30) Foreign Application Priority Data

Jul. 17, 2013 (DE) .................. 10 2013 107 607

(51) Int. Cl.
  *C03B 23/09* (2006.01)
  *C03B 23/049* (2006.01)
  (Continued)

(52) U.S. Cl.
  CPC .............. *C03B 23/092* (2013.01); *B65D 1/09* (2013.01); *C03B 21/06* (2013.01); *C03B 23/049* (2013.01); *C03B 23/11* (2013.01)

(58) Field of Classification Search
  CPC ................ C03B 23/092; C03B 23/11
  See application file for complete search history.

(56) References Cited

U.S. PATENT DOCUMENTS 2,087,947 A  7/1937  Dichter
2,447,568 A  8/1948  Eisler
(Continued)

FOREIGN PATENT DOCUMENTS

CN  101874760 A  11/2010
CN  102503089     6/2012
(Continued)

OTHER PUBLICATIONS

JPS30-7797 English Translation by LinguaLinx Language Solutions, Inc. Jul. 2018. (Year: 2018).*

(Continued)

*Primary Examiner* — Lisa L Herring
(74) *Attorney, Agent, or Firm* — Ohlandt, Greeley, Ruggiero & Perle, L.L.P.

(57) ABSTRACT

A method for producing glass vials, in particular pharmaceutical vials or pharmaceutical ampoules, from a glass tube is provided, the method including the following steps: (a) rotating the glass tube about a longitudinal axis thereof; (b) locally heating the glass tube from one side by means of at least one burner to at least the softening temperature of the glass; (c) reducing the diameter by pressing at least one forming body laterally against the heated region; and (d) separating the glass tube by means of a burner. A glass vial produced in such a way releases a reduced amount of alkali in accordance with ISO 4802 and has a decreased delamination tendency. Furthermore, in the hot-formed peripheral region, the alkali content is only slightly reduced when compared with the alkali content in the glass interior.

17 Claims, 3 Drawing Sheets

(51) Int. Cl.
*C03B 23/11* (2006.01)
*C03B 21/06* (2006.01)
*B65D 1/09* (2006.01)

(56) References Cited

U.S. PATENT DOCUMENTS

| | | | |
|---|---|---|---|
| 2,835,079 A | 5/1958 | Camarata et al. | |
| 2,935,819 A | 5/1960 | Dichter | |
| 3,368,588 A | 2/1968 | Meyer | |
| 3,375,948 A | 4/1968 | Creevy | |
| 3,537,833 A | 11/1970 | Gossie | |
| 3,652,247 A | 3/1972 | Nakayama et al. | |
| 4,746,345 A | 5/1988 | Pluijms | |
| 4,869,744 A * | 9/1989 | Romberg | C03B 23/092 65/105 |
| 5,221,311 A * | 6/1993 | Rising | B01L 3/569 215/47 |
| 5,902,368 A | 5/1999 | Witzmann | |
| 7,980,096 B2 | 7/2011 | Bartsch | |
| 2004/0045319 A1* | 3/2004 | Schussler | C03B 23/043 65/34 |
| 2004/0129026 A1 | 7/2004 | Bartsch | |
| 2009/0099000 A1 | 4/2009 | Kuwabara et al. | |
| 2010/0089097 A1 | 4/2010 | Brack et al. | |
| 2010/0203269 A1* | 8/2010 | Langsdorf | C03B 19/04 428/34.4 |
| 2012/0094821 A1* | 4/2012 | Schenk | C03B 23/045 501/11 |

FOREIGN PATENT DOCUMENTS

| | | | | | |
|---|---|---|---|---|---|
| DE | 2818486 A1 | * | 10/1979 | | C03B 23/0473 |
| DE | 10332176 A1 | | 2/2004 | | |
| DE | 102008051614 A1 | | 4/2010 | | |
| EP | 0187507 | | 7/1986 | | |
| EP | 0295746 A1 | | 12/1988 | | |
| EP | 2239237 A2 | | 10/2010 | | |
| EP | 2239237 A3 | | 12/2010 | | |
| IN | 200901467 I2 | * | 5/2012 | | C03B 29/02 |
| JP | S30-7797 | | 10/1955 | | |
| JP | S35-15545 | | 10/1960 | | |
| JP | H04119932 | | 4/1992 | | |
| JP | 2980957 B2 | * | 11/1999 | | C03B 23/0473 |
| JP | 2001328612 | | 11/2001 | | |
| JP | 2010274091 | | 12/2010 | | |
| SU | 1172892 A1 | | 8/1985 | | |

OTHER PUBLICATIONS

JP2980957B2 English Translation by LinguaLinx Language Solutions, Inc. Jul. 2018. (Year: 2018).*
DE2818486A1 Machine Translation Performed by ProQuest, Oct. 31, 2018. (Year: 2018).*
Pharmacopoeial, "Containers—Glass", Pharmacopeial Forum, vol. No. 32(4) p. 1171, per wayback machine available online, May 16, 2012. (Year: 2012).*
English translation of Written Opinion of the International Searching Authority dated Sep. 18, 2014 for corresponding PCT/EP2014/062550, 7 pages.
English translation of International Preliminary Report on Patentability dated Jan. 19, 2016 for corresponding PCT/EP2014/062550, 8 pages.
"Special Glass Containers for Primary Packaging: Alkali Release Measurement", Pharma Information Letter, 8th Edition, Jun. 2004, www.schott.com/tubing, 6 pages.
English translation of International Search Report dated Sep. 18, 2014 for corresponding PCT/EP2014/062550, 3 pages.
YouTube video https://www.youtube.com/watch?v=080jlYETK2A Still images of "Couquelet (NCE) glass vial machine (IF-16/MF-30)", with English translation. 40 pages.
YouTube video https://www.youtube.com/watch?v=RliWzn2VrDs Still images of "GMS EN ACCION", with English translation. 43 pages.

* cited by examiner

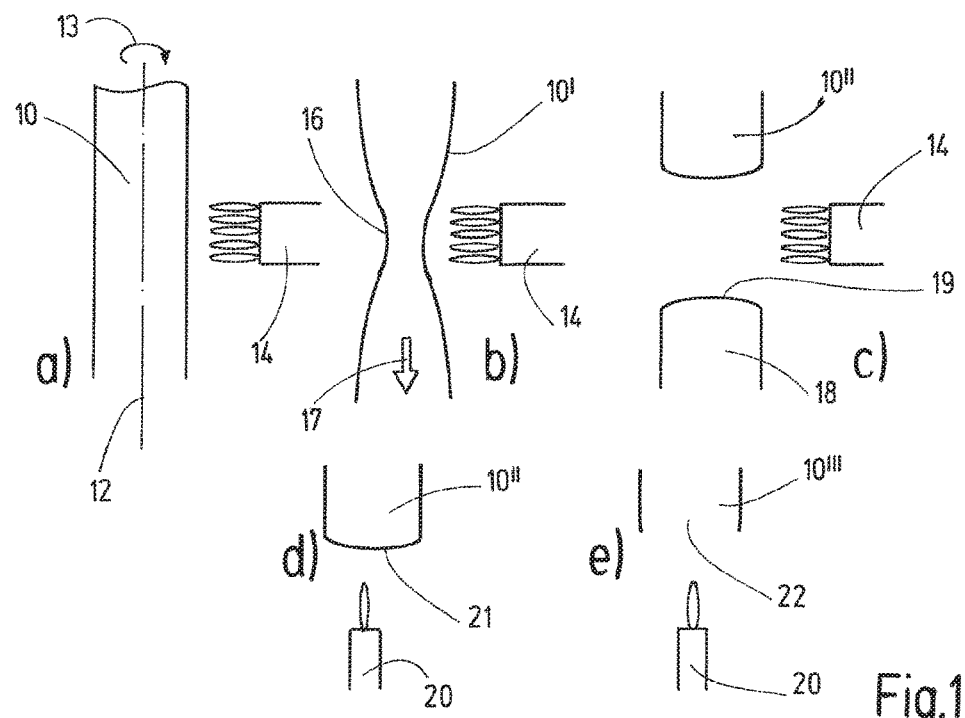
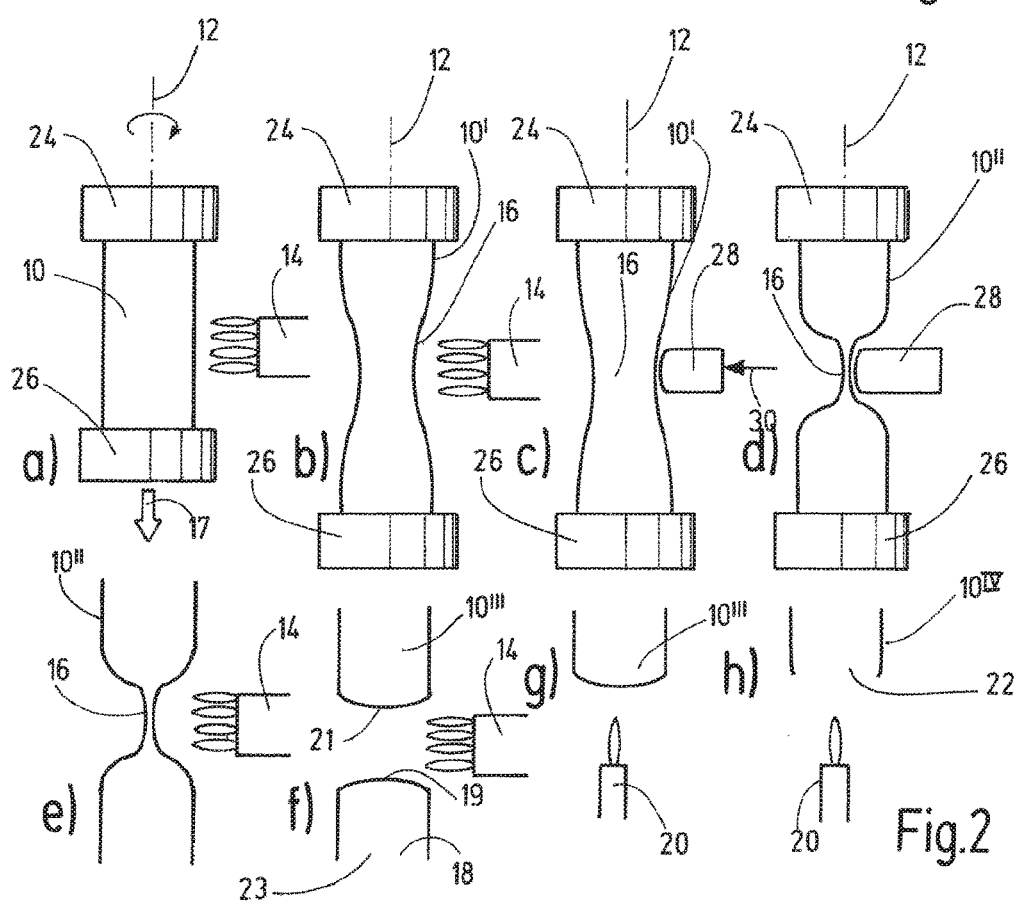

METHOD OF PRODUCING GLASS VIALS

CROSS REFERENCES TO RELATED APPLICATIONS

This application is a continuation of international patent application PCT/EP2014/062550, filed on Jun. 16, 2014 designating the U.S., which international patent application has been published in German language and claims priority from German patent application 10 2013 107 607.6, filed on Jul. 17, 2013. The entire contents of these applications are incorporated herein by reference.

BACKGROUND OF THE INVENTION

The invention relates to a method of producing glass vials, in particular pharmaceutical vials or pharmaceutical ampoules, as well as a glass vial produced thereby.

Glass bottles that are used for pharmaceutical purposes (also known as so-called "vials") consist of neutral glasses, i.e. glasses that can be assigned to the hydrolytic class 1, to this end also the normalized test ISO 719 (DIN 12111) is used. In particular borosilicate glasses, such as a DURAN® or Fiolax® (both registered trade-marks of SCHOTT AG, Mainz) belong to the neutral glasses.

Pharmaceutical vials, or pharmaceutical ampoules, respectively, in addition must have an alkali emission as low as possible, wherein measurement is performed according to the normalized test ISO 4802. In addition, so-called delaminations must be avoided, i.e. flake-offs of regions on the glass surface which result in particular from glass components evaporated during hot-forming and precipitated on the glass surface. Namely, in the worst case such delaminations could enter into the contents of the pharmaceutical vials and could thus spoil the content.

According to the prior art pharmaceutical vials usually are prepared from borosilicate glass by hot-forming a borosilicate glass tube. Herein firstly from the open tube end the orifice of the vial is formed. Thereafter the vial bottom is formed and simultaneously the vial is separated from the residual of the glass tube.

The production of pharmaceutical vials is performed in several steps. Usually, in a first step a glass tube is secured in an upper and a lower chuck and then rotated. The rotating glass tube in a certain region is heated by one or two separating burners so far that it becomes deformable. As soon as this temperature is reached, the tube—under continuing rotation and heating by means of the burner—is extended in axial direction by means of a linear movement of the lower chuck. Thereby the tube in the heated region extends under simultaneous tapering of its diameter, so that a constriction region results. After the upward movement the construction area is further heated. In this way the glass tube at the constriction region further contracts by means of the flow pressure of the burner gases so that the glass walls in the heated region melt together and finally the connection between the upper and the lower tube region pulls off.

Thus two tube sections with closed ends are generated, wherein the upper tube section is the final vial, and the lower tube section is the residual glass tube from which further vials can be formed. In a subsequent step below the upper tube section a so-called "piercing burner" is placed to melt again the bottom of the upper tube section. Also during this procedure the upper tube section is rotated.

This is basically known from U.S. Pat. No. 2,935,819.

From EP-A-2 239 237 this production method is also known. Accordingly, in the beginning the orifice of the vial is formed and thereafter the bottom. During bottom forming the glass tube must be heated to a higher temperature, and thus alkali borate components can evolve from the glass tube and can precipitate on the inner surface of the vial. Thus a modified region on the inner surface of the glass vial results from which alkali components can be easily leached and which also tends to delaminate.

For reducing the alkali leaching also treatments with sodium sulphate or a CVD coating of the inner surface with a thin quartz layer are known.

According to US-A1-2009/0099000 it is tried to reduce the alkali evaporation by reversing the production steps during the vial production. Accordingly, in the beginning the bottom shall be formed, only thereafter the vial neck is formed. A further reduction of the alkali evaporation shall be reached by an additional treatment of the inner surface by means of a flame during the bottom forming.

According to EP-A-2 239 237 it is suggested for reducing the alkali leaching to treat the inner surface of the glass vial by means of a burner flame to remove alkali or similar components sticking thereto.

Thereby alkali leaching shall be reduced.

The known production methods on the one hand are relatively tedious or on the other hand lead to results, wherein the alkali elution is still too high.

SUMMARY OF THE INVENTION

In view of this it is a first object of the invention to disclose a method of producing glass vials or ampoules that in particular is suitable for the preparation of pharmaceutical vials or ampoules.

It is a second object of the invention to disclose a method of producing glass vials or ampoules having a reduced alkali release.

It is a third object of the invention to disclose a pharmaceutical glass vial or ampoule having a reduced alkali release.

It is a forth object of the invention to disclose a pharmaceutical glass vial or ampoule having a reduced delamination tendency.

These and other objects according to one aspect of the invention are achieved by a method of producing glass vials, in particular pharmaceutical vials, from a glass tube comprising the following steps:

(a1) providing a glass tube made of a glass having a certain softening temperature;

(a) rotating the glass tube about a longitudinal axis thereof at a rotating speed of 200 $min^{-1}$ to 500 $min^{-1}$;

(b) local heating of said glass tube by means of a burner from at least one side at least up to said softening temperature of said glass;

(c) reducing a diameter of said glass tube by pressing at least one forming part laterally against said heated region; and (d) separating said glass tube by means of a burner.

The object of the invention is fully solved in this way.

According to the invention it is effected that the softened region is considerably further reduced in its diameter by the additional step (c), i.e. by means of a diameter reduction by pressing at least one forming part against the softened region, before in the subsequent separating step (d) the separating is performed by means of a burner.

This leads to the consequence that the separating can be performed considerably faster in and/or that the temperature in the region to be separated can be considerably lower than in prior art processes. Due to the shortened separating time, or the lower temperature, respectively, considerably less alkali borate vapors are generated. Also a smaller amount re-condensates in the colder regions on the inner vial surface. In this way the alkali release of the vials is considerably reduced according to the test ISO 4802. At the same time the delamination tendency is considerably reduced.

In a further development of the invention after the heating of the glass tube in step (b) a further step (b1) is performed, wherein an extension of the rotating glass tube in axial direction is performed for generating a constriction region.

According to a preferred development of the invention the steps (a) to (d) and possibly (b1) are performed with rotating glass tube in the given sequence.

After the separating step (d) apart from the formed vial the glass tube remains with a closed end. Suitably in a subsequent step this end is pierced again by means of a burner (piercing burner) so that subsequently the forming of the next glass vial can be done.

In a suitable development of the invention the rotating glass tube after step (a) is heated first and formed at one end to generate a neck region of the vial to be formed, before subsequently in a predefined distance from the end the local heating by means of a burner is performed.

Preferably, the glass tube is driven at a rotational speed of 200 $min^{-1}$ to 500 $min^{-1}$, preferably at 250 $min^{-1}$ to 450 $min^{-1}$, further preferred at 300 $min^{-1}$ to 400 $min^{-1}$.

It was found that with such a rotational speed the individual process steps of the local heating, diameter reduction, the separating and possibly the elongation of the glass tube can be performed in a particularly advantageous manner.

Preferably, a glass tube consisting of a neutral glass configured as a borosilicate glass is utilized for producing the glass vials.

According to a further development of the invention the forming body consists of a tungsten alloy, electro-graphite or of heat-resistant steel.

In particular, when preparing the forming body from a tungsten alloy or from electro-graphite a particularly advantageous wetting behavior to the glass surface results which assists in a diameter reduction.

According to a further development of the invention the forming body is driven rotatingly.

By means of a rotating drive the diameter reduction in the heated region can be further improved.

According to a further development of the invention the forming body is additionally heated.

A heating of the forming body further assists in the diameter reduction.

Preferably, the forming body is configured tapering towards the glass tube, preferably running at an acute angle.

Also thereby the diameter reduction is further improved.

According to a further development of the invention it is preferred to advance one forming body each from both sides of the glass tube.

By these measures in total the diameter reduction in the heated region is considerably improved.

By the improved diameter reduction the separating process is simplified so that less alkali borate evaporation losses result.

Thereby the time is considerably shortened during which the glass tube is subject to the flame of the separating burner so that any alkali borate evaporation is considerably reduced.

At the same time the temperature of the separating burner can be considerably reduced when compared with prior processes.

The object of the invention is also solved by a glass vial, in particular a pharmaceutical vial, comprising a closed bottom and an open bottleneck which, preferably, consists of a neutral glass, in particular of a borosilicate glass, wherein the alkali content in the heat-formed region close to the surface is reduced up to 30% at most, preferably up to 20% at most, more preferably up to 10% at most, when compared with the alkali content within the glass interior.

In addition, the object of the invention is solved by such a glass vial, in particular a pharmaceutical vial, wherein the sodium release according to ISO 4802-2 is smaller than 0.5 $\mu g/cm^2$, preferably smaller than 0.25 $\mu g/cm^2$.

The pharmaceutical vials produced according to the invention have a significantly smaller alkali release than their prior art glass vials and have a considerably reduced delamination tendency as well as a more even alkali distribution than prior art glass vials.

Thus in total the glass vials according to the invention have considerably improved characteristics for utilization as pharmaceutical vials.

It shall be understood that the features mentioned above and to be explained hereinafter cannot only be used in the given combination, but also in different combinations or independently, without departing from the scope of the present invention.

BRIEF DESCRIPTION OF THE DRAWINGS

Further features and advantages of the invention can be taken from the subsequent description of preferred embodiments with reference to the drawings. In the drawings show:

FIG. 1 a schematic representation of the process steps for hot-forming of pharmaceutical vials according to the prior art;

FIG. 2 a schematic representation of the process steps when forming pharmaceutical vials according to the invention;

DETAILED DESCRIPTION OF PREFERRED EMBODIMENTS

Figure 3:
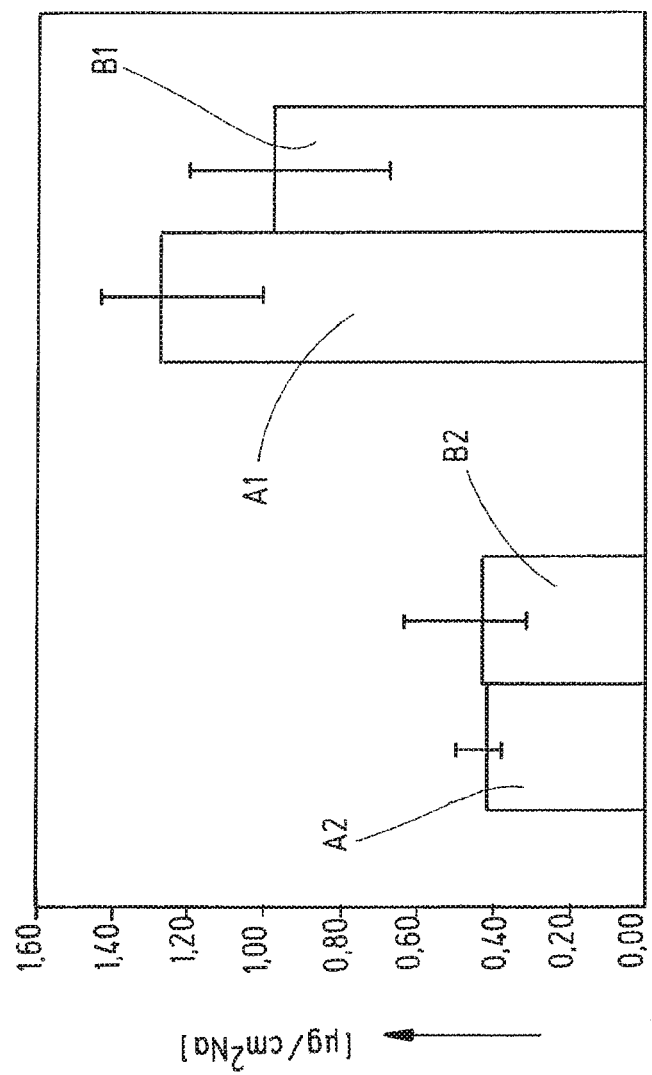
FIG. 3 a comparison of the sodium release according to the test procedure ISO 4802-2 for two borosilicate glass types (type 1 and type 2), wherein the test results generated with prior art borosilicate glasses of type 1 and type 2 are designated with A1 and B1, respectively, and are compared to the glass vials according to the invention, while using the same constraints and dimensions.

With reference to FIG. 1 firstly the hot-forming of pharmaceutical vials according to the prior art (compare e.g. U.S. Pat. No. 2,935,819 or EP-A2-2 239 237) is explained.

A glass tube 10 which may consist of a borosilicate glass, such as Fiolax® (registered trademark of SCHOTT AG, Mainz) is clamped between two chucks and is driven rotatingly about its longitudinal axis 12, such as depicted by an arrow 13.

Now by means of a burner 14 that is placed laterally and is directed directly onto the shell surface of the glass tube 10, the glass tube 10 according to FIG. 1a) is heated so long, until it softens and becomes deformable. As soon as this temperature is reached, the glass tube 10, while continuing its rotation and heating by means of the burner 14, is expanded in axial direction by means of a linear movement of the lower chuck, as indicated by the arrow 17 in FIG. 1b).

Thereby the glass tube in the heated region is extended while simultaneously contracting its diameter, this leading to a constriction region 16 having a reduced diameter. After the downward movement the constriction region 16 is further heated. Herein the glass tube 10' at the constricted position is further contracted by means of the flow pressure of the burner gases, so that the glass shell in the heated region melts together, such as shown in FIG. 1c), and finally the connection between the upper and the lower tube section tears off. Thus two tube sections with closed ends are generated, wherein the lower tube section is the final vial 18 with the bottom 19, and the upper tube section is the remaining glass tube 10" from which the next vials are formed. In a subsequent step below the upper tube section 10" a so-called "piercing burner" 20 is placed for re-melting the closed end 21 of the upper tube section 10", as shown in FIG. 1b).

Investigations of the inventors have shown that in particular the heating by the burner 14, whereby finally the separating of the glass tube 16 in its constriction region 16 into two closed parts is generated, is responsible for a strong evaporation of alkali borates from the glass matrix.

According to the process of the invention the alkali borate evaporation is considerably reduced, since the necessary temperature during separating of the glass tube is considerably reduced.

In the following, this is described in more detail with reference to FIG. 2.

Herein corresponding reference numerals are used for corresponding parts.

In a first step according to FIG. 2a) a glass tube 10 which for instance may consist of borosilicate glass, such as Fiolax® (registered trademark of SCHOTT AG, Mainz) is vertically clamped between an upper chuck 24 and a lower chuck 26. The glass tube 10 is thereafter driven rotatingly about its longitudinal axis 12. To this end for instance a rotational speed of about 300 to 400 l/min can be utilized. Thereafter the rotating glass tube 10 is heated by one or two separating burners 14 during continuing rotation, by directing the burner flame directly radially onto the glass tube 10, whereby a region of about 2 cm is heated. As soon as the glass tube 10 has been softened so far so that it becomes deformable, it is extended by moving the lower chuck 26 axially downwards, as indicated by arrow 7. Thereby the glass tube 10 is extended in its heating range while simultaneously contracting its diameter, so that a constricted region 16 is generated. Now the burner 14 is swiveled laterally and during further rotation of the tube a forming part 28 is pressed into the glass tube 10 radially as far as possible, so that only a glass connection as slim as possible between the upper and the lower tube section remains, as indicated in FIGS. 2c) and 2d).

The step of extending in axial direction for generating a constricted region 16 can also be dispensed with. Instead directly a deforming of the glass tube 10, which has been heated at least to the softening temperature $E_w$, can be performed by impressing the forming part 28.

The forming part 28 used herein preferably consists of a tungsten alloy or of an electro-graphite and at its surface pointing towards the glass tube is rounded or pointed.

Thereafter the forming part 28 is swiveled away again, and the burner 14 before the remaining constricted region 16 of the glass tube 10" is swiveled back for melting off the remaining slim glass slab.

Then according to FIG. 2f) again two parts having a closed bottom are generated, wherein the lower part is the finally produced glass vial 18 having the bottom 19, and wherein the upper part is the glass tube 10'" having a closed end 21 and being held in the upper chuck 24. In the subsequent steps according to FIGS. 2g) and 2h) the closed end of the glass tube 10'" again is re-melted by means of the piercing burner 20 for generating an orifice 22 at the lower end of the glass tube 10"" according to FIG. 2h).

The process direction which has been amended with respect to the prior art substantially in that after an initial heating and possibly expanding of the glass tube the heated region 16 is strongly diminished by impressing a forming part 28 radially, so that only a slim residual slab remains, leads to the consequence that it can be worked at lower temperature during the separating process or, respectively, that the separating process is shortened. This again has the consequence that considerably less alkali losses result and finally also that the test results during the leaching test according to ISO 4802 are considerably improved. If the step of expanding is even dispensed with, then the softening temperature or a temperature only slightly there above is sufficient to generate the necessary diameter reduction.

It is understood of course that first a possible neck region can be formed by means of a burner flame and possibly by means of a forming part at the lower end of the glass tube, such as basically known in the prior art, before the diameter reduction with the subsequent separating process is initiated. Since this does not belong to the core of the invention, it is not described here in more detail.

For comparison purposes there were prepared on a single station tube processing device using glass tubes of the glass type 1 and 2, respectively (both borosilicate glasses of SCHOTT AG, Mainz) having an outer diameter of 16 mm and a wall thickness of 1 mm containers according to the prior art forming method according to FIG. 1 and according to the new bottom forming method according to the invention according to FIG. 2.

The glass type 2 is the borosilicate glass marketed by the SCHOTT AG under the trademark Fiolax®, having the following main components (in wt.-% on oxide basis).

| | |
|---|---|
| $SiO_2$ | 75 |
| $B_2O_3$ | 10.5 |
| $Al_2O_3$ | 5 |
| $Na_2O$ | 7 |
| BaO | <<1 |
| CaO | 1.5 |

The softening temperature $E_w$ lies at only 785° C., while the processing temperature $V_A$ lies at 1165° C. During the processing according to the prior art the glass tube for extending for generating a constricted region the glass tube had to be heated up to the working temperature.

The total processing time from the beginning of the heating of the glass tube up to the forming of the glass bottoms at both tube ends was identical with both processing methods.

Both containers which were prepared according to the prior art method and according to the method according to the invention were analyzed according to the test procedure ISO 4802-2 for their sodium release on the container inner surface.

The test procedure is given in the norm ISO 4802-2 and is described in more detail in "Special Glass Containers for Primary Packaging: Alkali Release Measurement", Pharma Information Letter, 8th edition, 06/2004, pages 1 to 6.

The resulting sodium release is summarized in FIG. 3 in $\mu m/cm^2$. The bar A1 shows the sodium release of the samples from the borosilicate glass type 1 (Fiolax®) and B1 of the samples of the borosilicate glass type 2, both prepared according to the prior art method.

A2 and B2 show the corresponding sodium release on the glass samples produced according to the method of the invention.

A considerable reduction results in the sodium release of the glass vials prepared according to the method of the invention.

Figure 4:
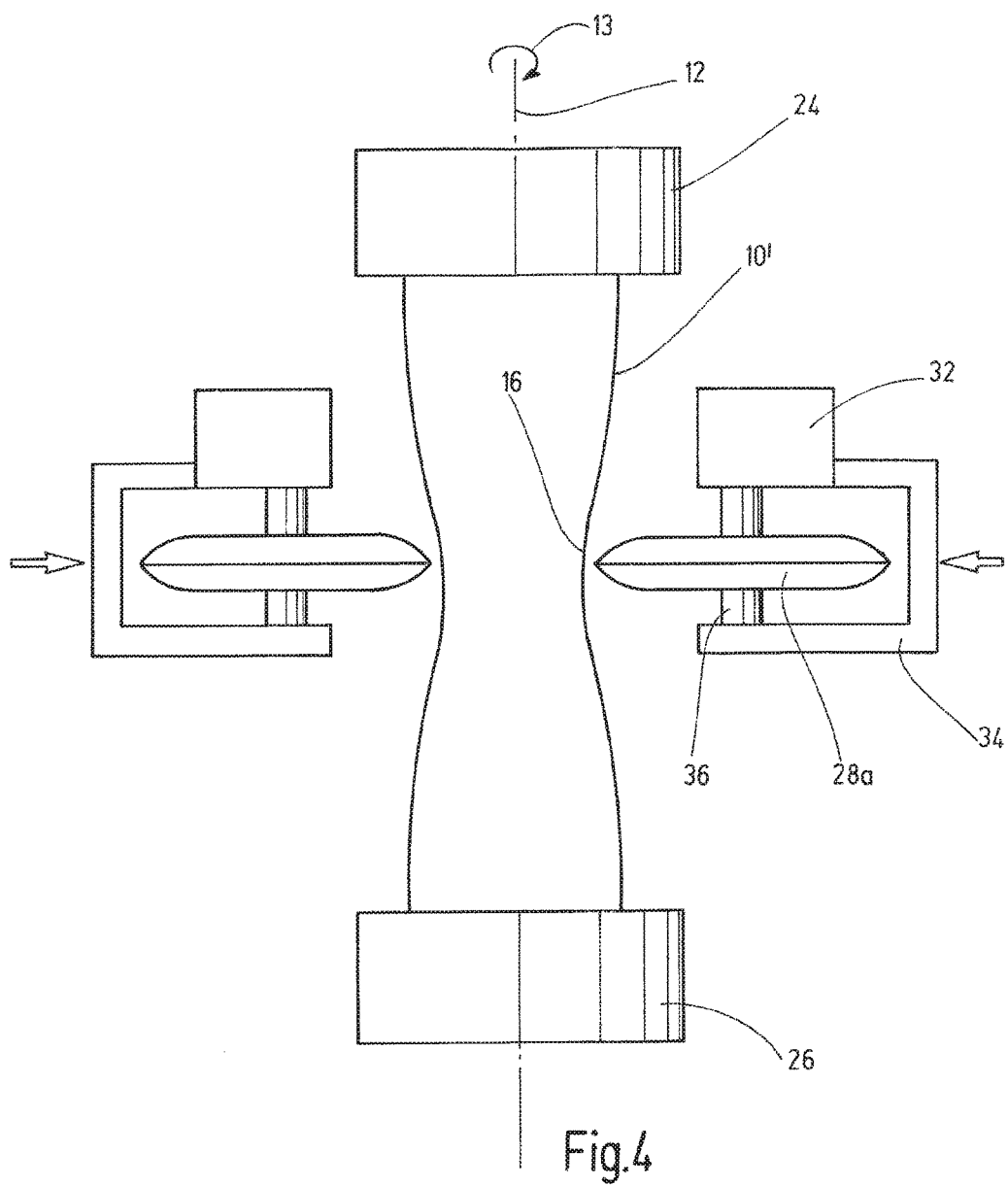
FIG. 4 an enlarged representation of a glass vial in the phase of diameter reduction by means of two forming bodies that are driven rotatingly.

In FIG. 4 a further variant of the method according to the invention is depicted.

Herein for corresponding parts corresponding reference numerals are used.

In this case the constriction region 16 of the rotating glass tube 10' is not only acted upon by a single forming body, as described before, but from both sides using one forming body 28a each.

In addition, the forming bodies 28a are driven rotatingly. They may be received on a movable frame 34 by means of a shaft 36 and may be driven by means of a drive 32 which, in addition, may be coupled with a heating device for additional heating of the forming bodies 28a.

Preferably, the forming bodies 28 or 28a, respectively, consist of a tungsten alloy, of pure tungsten or of electro-graphite. This leads to a particularly suitable wetting behavior with respect to the glass surface. Basically, also a preparation from heat-resistant steel is conceivable, however, the wetting behavior is better with tungsten or graphite, respectively. Preferably, the forming body 28 or 28a, respectively tapers towards the glass tube, in particular, an acute running form can be utilized. In case of rotatingly driven forming bodies 28a according to FIG. 4, thus e.g. a disk-shaped form results which extends pointed at the edge sides.

It is believed that when using such a design according to FIG. 4 a further reduction in the alkali release can be reached with respect to the test results shown in FIG. 3, wherein only one stationary forming body of steel being non-heated was utilized.

The invention claimed is:

1. A method of producing glass pharmaceutical vials and pharmaceutical ampoules, from a glass tube, comprising the steps of:
   (a1) providing said glass tube made of a glass having a certain softening temperature;
   (a) rotating said glass tube about a longitudinal axis thereof at a rotating speed of 200 $min^{-1}$ to 500 $min^{-1}$;
   (b) local heating of said glass tube by a burner from at least one side to said certain softening temperature of said glass to form a heated region;
   (c) reducing a diameter of said glass tube by pressing at least one forming part laterally against said heated region to form a constricted region; and
   (d) separating of said glass tube at said constricted region only by said burner so that two parts having a closed bottom are generated and so that said two parts have a sodium release according to ISO 4802-2 that is smaller than 0.5 $\mu g/cm^2$.

2. The method of claim 1, wherein after said step (b) an additional step (b1) is performed, wherein an extending of said glass tube in axial direction is performed for generating said constriction region.

3. The method of claim 1, wherein said steps (a) to (d) are performed one after another in the given sequence while said glass tube is rotating.

4. The method of claim 1, wherein said closed bottom of at least one of said two parts after said separating step (d) is pierced at its closed end by another burner.

5. The method of claim 1, wherein said glass tube after step (a) is initially heated at one end and formed for generating a neck region of the vial to be formed, and subsequently is heated in a predetermined distance from said one end according to step (b).

6. The method of claim 1, wherein said glass tube is driven at a rotating speed of 250 $min^{-1}$ to 450 $min^{-1}$.

7. The method of claim 1, wherein said glass tube is driven at a rotating speed of 300 $min^{-1}$ to 400 $min^{-1}$.

8. The method of claim 1, wherein said at least one forming part comprises a material selected from the group consisting of a tungsten alloy, an electro-graphite and a heat-resistant steel.

9. The method of claim 1, wherein said at least one forming part is driven rotatingly.

10. The method of claim 1, wherein said at least one forming part is heated.

11. The method of claim 1, wherein said at least one forming part tapers towards said glass tube.

12. The method of claim 11, wherein said at least one forming part is pointed.

13. The method of claim 1, wherein pressing said at least one forming part comprises advancing a forming body from both sides of said glass tube.

14. A method of producing glass pharmaceutical vials and pharmaceutical ampoules, from a glass tube, comprising the steps of:
   providing a glass tube made of a glass having a certain softening temperature;
   rotating said glass tube about a longitudinal axis thereof;
   locally heating said glass tube from at least one side to said certain softening temperature to form a locally heated region;
   pressing at least one forming part laterally against said locally heated region to reduce a diameter of said glass tube until only a glass connection of reduced diameter between upper and lower tube sections remains; and
   melting off, using a heater, said glass connection of reduced diameter so that two parts having a closed bottom are generated at said glass connection of reduced diameter using only said heater and so that an alkali content at an outer surface in the locally heated region is reduced up to at most 30% when compared with the alkali content at an inner surface.

15. The method of claim 14, further comprising, prior to said pressing step, extending of said glass tube in an axial direction to form a constriction in said heated region.

16. The method of claim 14, further comprising, prior to said melting off step, moving the at least one forming part out of contact with said glass tube.

17. The method of producing glass pharmaceutical vials and pharmaceutical ampoules, from a glass tube, comprising the steps of:
   rotating a glass tube about a longitudinal axis thereof while locally heating said glass tube to form a locally heated region;
   reducing a diameter of said locally heated region until a glass connection of reduced diameter between upper and lower tube sections remains; and
   melting off, using a heater, said glass connection of reduced diameter so that two parts having a closed bottom are generated at said glass connection of reduced diameter using only said heater and so that said two parts have a sodium release according to ISO 4802-2 that is smaller than 0.5 $\mu g/cm^2$.

* * * * *